United States Patent
Martin et al.

(10) Patent No.: US 12,321,782 B2
(45) Date of Patent: Jun. 3, 2025

(54) AUTONOMOUS CORE AFFINITY

(71) Applicant: Dell Products L.P., Hopkinton, MA (US)

(72) Inventors: Owen Martin, Hopedale, MA (US); Ramesh Doddaiah, Westborough, MA (US); Michael Scharland, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 61 days.

(21) Appl. No.: 18/327,924

(22) Filed: Jun. 2, 2023

(65) Prior Publication Data
US 2024/0403122 A1    Dec. 5, 2024

(51) Int. Cl.
*G06F 9/50* (2006.01)
*G06F 9/455* (2018.01)
*G06F 9/48* (2006.01)

(52) U.S. Cl.
CPC ............ *G06F 9/5027* (2013.01); *G06F 9/455* (2013.01); *G06F 9/4856* (2013.01); *G06F 9/50* (2013.01)

(58) Field of Classification Search
CPC ...... G06F 9/5027; G06F 9/455; G06F 9/4856; G06F 9/50
See application file for complete search history.

(56) References Cited

U.S. PATENT DOCUMENTS

| | | | |
|---|---|---|---|
| 6,466,965 B1 * | 10/2002 | Chessell ................. | G06F 9/466 718/101 |
| 8,756,307 B1 * | 6/2014 | Chen ................... | G06F 11/3414 709/224 |
| 9,189,272 B2 * | 11/2015 | Kanemasa ............ | G06F 9/4881 |
| 9,239,786 B2 * | 1/2016 | Ki ........................ | G06F 3/0679 |
| 9,250,953 B2 * | 2/2016 | Kipp ..................... | G06F 9/4881 |
| 9,454,321 B1 * | 9/2016 | Smaldone .............. | G06F 3/061 |
| 10,491,662 B2 * | 11/2019 | Srikanth ............... | G06F 16/958 |
| 11,209,998 B2 * | 12/2021 | Bahar .................... | G06F 3/0679 |
| 2018/0081594 A1 * | 3/2018 | Jung ................... | G11C 16/3495 |

* cited by examiner

*Primary Examiner* — Corey S Faherty
(74) *Attorney, Agent, or Firm* — Anderson Gorecki LLP

(57) ABSTRACT

In a storage system in which processor cores are exclusively allocated to run process threads of individual emulations, the allocations of cores to emulations are dynamically reconfigured based on forecasted workload. A workload configuration model is created by testing different core allocation permutations with different workloads. The best performing permutations are stored in the model as workload configurations. The workload configurations are characterized by counts of tasks required to service the workloads. Actual task counts are monitored during normal operation and used to forecast changes in actual task counts. The forecasted task counts are compared with the task counts of the workload configurations of the model to select the best match. Allocation of cores is reconfigured to the best match workload configuration.

20 Claims, 7 Drawing Sheets

| | FE | DS | BE |
|---|---|---|---|
| Implemented WL | 16 | 16 | 16 |
| | Target | Source | Source |
| WL closest to forecast | 32 | 4 | 12 |
| Delta | 16 | -12 | -4 |

| Workload Label | FE Cores | RDS Cores | DS Cores | BE Cores |
|---|---|---|---|---|
| WL1 | 32 | 0 | 4 | 12 |
| WL2 | 16 | 0 | 4 | 28 |
| WL3 | 12 | 0 | 24 | 12 |
| WL4 | 12 | 0 | 18 | 18 |
| WL5 | 26 | 0 | 4 | 18 |
| WL6 | 16 | 0 | 10 | 22 |
| WL7 | 12 | 0 | 20 | 16 |

Figure 3

Current Workload Configuration 500

| Core | Active | Hibernating | Hibernating |
|---|---|---|---|
| 4 | FE | | |
| 8 | DS | | |
| 12 | BE | | |
| 16 | FE | DS | BE |
| 20 | FE | DS | BE |
| 24 | FE | DS | BE |
| 28 | DS | FE | BE |
| 32 | DS | FE | BE |
| 36 | DS | FE | BE |
| 40 | BE | DS | FE |
| 44 | BE | DS | FE |
| 48 | BE | DS | FE |

Best Match to Forecast Workload Configuration 502

| Core | Active | Hibernating | Hibernating |
|---|---|---|---|
| 4 | FE | | |
| 8 | DS | | |
| 12 | BE | | |
| 16 | FE | DS | BE |
| 20 | FE | DS | BE |
| 24 | FE | DS | BE |
| 28 | FE | DS | BE |
| 32 | FE | DS | BE |
| 36 | FE | DS | BE |
| 40 | BE | DS | BE |
| 44 | BE | DS | FE |
| 48 | BE | DS | FE |

Figure 5

AUTONOMOUS CORE AFFINITY

TECHNICAL FIELD

The subject matter of this disclosure is generally related to data storage systems.

BACKGROUND

Data storage systems are used by organizations to maintain storage objects that store data used by instances of host applications that run on host servers. Examples of such storage systems may include, but are not limited to, storage arrays, storage area networks (SANs), and network-attached storage (NAS). Examples of host applications may include, but are not limited to, software for email, accounting, manufacturing, inventory control, and a wide variety of other organizational processes. Each storage object is a logical disk drive that abstracts the storage capacity of arrays of physical disk drives. A separate storage object or group of storage objects is typically created to store all data for all instances of a single host application. Input-output (IO) commands are sent by the host applications to the storage systems to access the storage objects. The amount of IO traffic handled by the storage systems can vary based on the number and types of host applications being supported. Moreover, individual storage systems may be required to handle dynamically varying amounts of IO traffic.

SUMMARY

A method in accordance with some implementations comprises: creating a model of storage system workload configurations, each workload configuration including counts of tasks that characterize a different workload and exclusive allocations of processor cores to emulations for servicing the respective workload; counting the tasks performed to service a current actual workload; forecasting a change in the current actual workload based on the counted tasks; and selecting and implementing one of the workload configurations of the model based on comparison of the counts of tasks associated with the workload configurations and the forecasted change in the current actual workload based on the counted tasks.

An apparatus in accordance with some implementations comprises: a plurality of compute nodes that manage access to non-volatile drives; a model of storage system workload configurations, each workload configuration comprising counts of tasks that characterize a different workload and exclusive allocations of processor cores to emulations for servicing the respective workload; a task count monitor configured to count the tasks performed to service a current actual workload; a workload forecaster configured to forecast a change in the current actual workload based on the counted tasks; and a core allocation updater configured to select and implement one of the workload configurations of the model based on comparison of the counts of tasks associated with the workload configurations and the forecasted change in the current actual workload based on the counted tasks In accordance with some implementations, a non-transitory computer-readable storage medium stores instructions that when executed by a computer perform a method comprising: creating a model of storage system workload configurations, each workload configuration including counts of tasks that characterize a different workload and exclusive allocations of processor cores to emulations for servicing the respective workload; counting the tasks performed to service a current actual workload; forecasting a change in the current actual workload based on the counted tasks; and selecting and implementing one of the workload configurations of the model based on comparison of the counts of tasks associated with the workload configurations and the forecasted change in the current actual workload based on the counted tasks.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 3 illustrates a workload model.

FIG. 5 illustrates current and forecast workload configurations.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and storage arrays. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
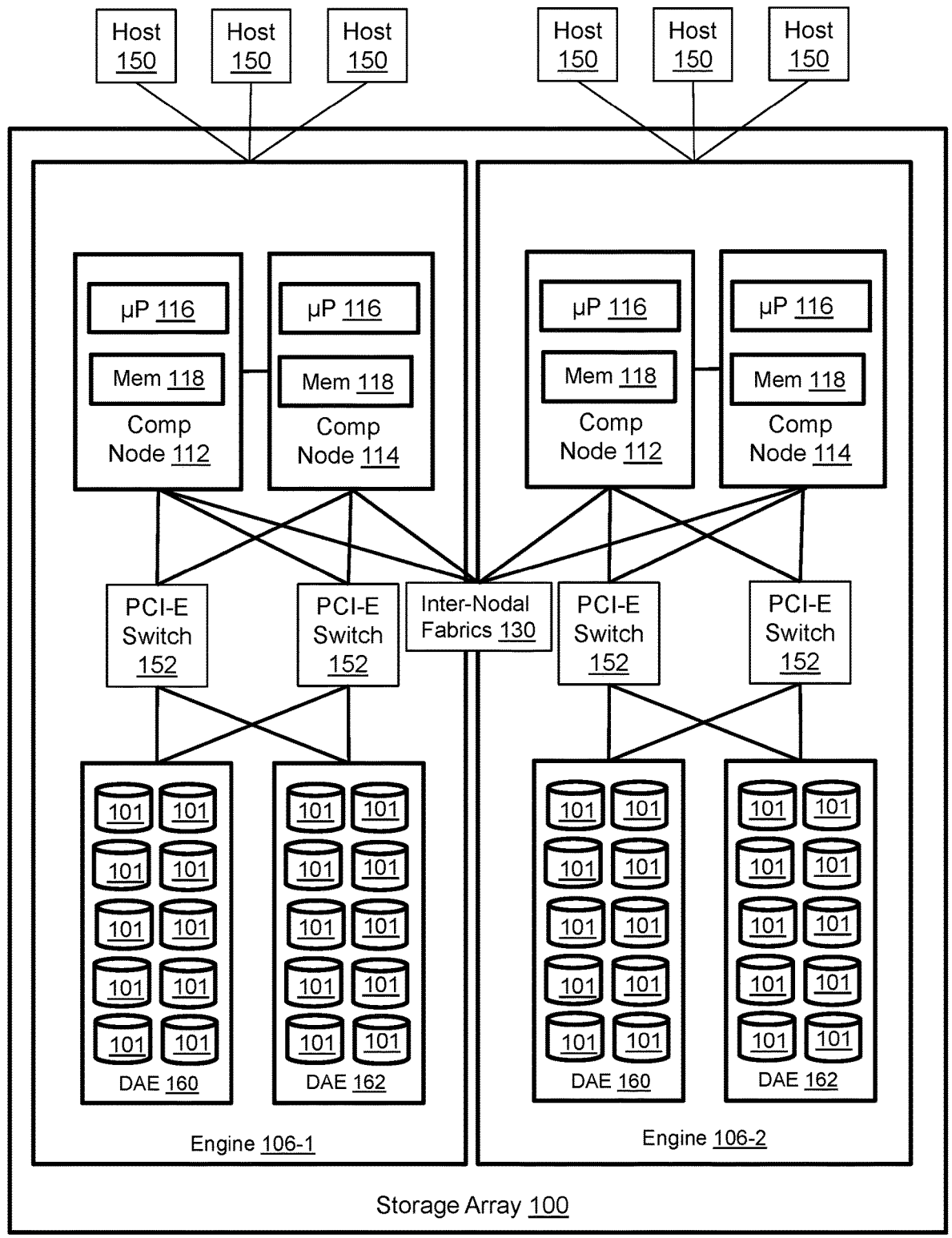
FIG. 1 illustrates a storage system in which autonomous core affinity is implemented.

FIG. 1 illustrates a storage system in which autonomous core affinity is implemented. The specifically illustrated storage system is a storage array 100, but other types of storage systems could be used. Storage array 100 is shown with two engines 106-1, 106-2, but might include any number of engines. Each engine includes disk array enclosures (DAEs) 160, 162 and a pair of peripheral component interconnect express (PCI-E) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array using direct memory access. Each compute node includes one or more adapters and ports for communicating with host servers 150 to service IOs from the host servers. Each compute node also includes one or more adapters for communicating with other compute nodes via redundant inter-nodal channel-based InfiniBand fabrics 130.

Figure 2:
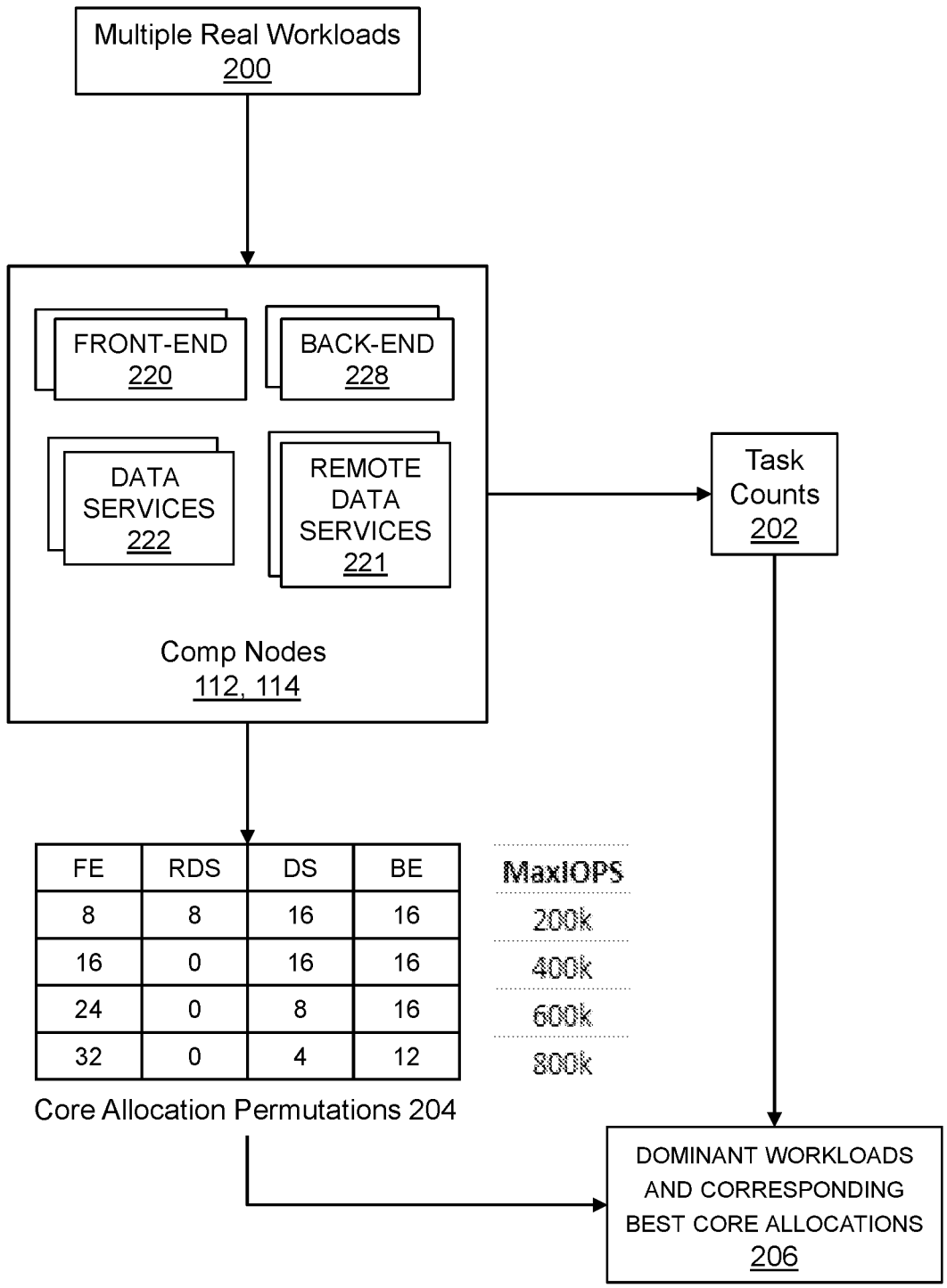
FIG. 2 illustrates generation of workload models.

Referring to FIGS. 1 and 2, each compute node 112, 114 runs emulations for completing different storage-related tasks and functions. Front-end emulations 220 handle communications with the host servers 150. For example, front-end emulations receive IO commands from host servers and return data and write acknowledgements to the host servers. Each front-end emulation has exclusively allocated resources for servicing IOs from the host servers. The exclusively allocated resources include processor cores, volatile memory, and ports via which the hosts may access the storage array. Back-end emulations 228 handle communications with managed drives 101 in the DAEs 160, 162. Each back-end emulation has exclusively allocated resources for accessing the managed drives. The exclusively allocated resources include processor cores, volatile memory, and ports. Data services emulations 222 process IOs. For example, data services emulations maintain metadata that maps between logical block addresses of the storage objects to which IOs from the host applications are directed and the physical addresses on the managed drives. The data services emulations maintain the shared memory in which data is temporarily copied to service IOs. For example, Read IOs characterized as "read-miss" prompt a data services emulation to cause a back-end emulation to copy the data from the managed drives into the shared memory. The data services emulation then causes the front-end emulation to return the data to the host application. In the case of a "read-hit" in which the data is already in shared memory when the IO is received, the data is accessed from the shared memory without being copied from the managed drives by the back-end emulation in response to the IO. Write IOs prompt the data services emulations to copy the data into the shared memory, generate a write acknowledgement, and eventually prompt a back-end emulation to destage the data to the managed drives. Each data services emulation has exclusively allocated resources for servicing IOs from the host servers. The exclusively allocated resources include processor cores, volatile memory, and ports via which the hosts may access the storage array. Remote data services emulations 221 handle communications with other storage systems, e.g., other storage arrays for remote replication and remote snapshot creation. Each remote data services emulation has exclusively allocated resources for servicing IOs from the host servers. The exclusively allocated resources include processor cores, volatile memory, and ports via which the hosts may access the storage array. Each emulation includes a process with multiple worker threads.

Allocations of processors cores to emulations can be changed but the processor cores allocated to an emulation are not available for use by other emulations during the time when the allocation is in effect. In other words, process threads of only one emulation run on a core at any given time. While this facilitates scheduling and computational efficiency, the computational loading of different emulations varies depending on the types of host applications that are supported by the storage system and dynamically varying workloads, so no single core allocation configuration is most efficient for all storage systems at all times. For example, a workload that is heavy with random reads does not exert the same computational burden on the emulations as a regular read workload with many read-hits. Sequential reads/writes, encryption, compression, and deduplication also affect the computational workload between emulations. As will be explained in greater detail below, autonomous core affinity helps to overcome this problem by reconfiguring core allocations based on projected workloads.

FIG. 2 illustrates generation of workload models. The compute nodes 112, 114 are monitored while servicing multiple real workloads 200. The real workloads may be based on IO traces from different storage systems operating in real world environments. For each real workload, each of a variety of core allocation permutations 204 is tested and the workload is characterized by task counts 202. The task counts 202 are counts of the tasks required to be performed by the emulations to service the workload over a unit time. Examples of tasks include, but are not necessarily limited to, read hits, write hits, read misses, write misses, inline compressed read misses, incline compressed writes, dedupe without compression reads, dedupe writes, regular reads, regular writes, encrypted data read misses, encrypted writes, sequential reads, sequential writes, dedupe reads, snap target reads, and synchronous writes. The tasks are used as features of the workload models. Each workload is characterized by the counts of the features for that workload. Core allocation permutations 204 include different numbers of cores allocated to each emulation. The permutations may be randomly generated and repeated with each workload or be exhaustive of all possible permutations, potentially within constraints. For example, 48-core compute nodes may be observed with all permutations of allocations of sets of 4 cores. Performance of the compute nodes in terms of IOs per second (IOPS) serviced is observed for each workload for each core allocation permutation. The greatest IOPS observed for a given workload indicates the best core allocation permutation for that workload, where the workload is characterized by the task counts. In the illustrated example, the core allocation permutation with 32 cores allocated to front-end emulations, 4 cores allocated to data services emulations, and 12 cores allocated to back-end emulations is selected as the best configuration for the workload under evaluation because 800 k IOPS is the greatest IOPS observed. A subset of the evaluated workloads that are dominant is selected and the corresponding best core allocations 206 are included in the workload model. More specifically, the workload model includes the workload configurations of the dominant workloads, where each workload configuration includes the task count profile and corresponding best core allocations for one of the dominant workloads.

FIG. 3 illustrates a workload model. The illustrated workload model includes seven different workload configurations labelled WL1 through WL7, but any number of workload configurations greater than one might be included. Each workload configuration is characterized by numbers of cores allocated respectively to front-end emulations, back-end emulations, data services emulations, and remote data services emulations. Not specifically illustrated but included in the workload model are the task counts associated with each workload configuration.

Figure 4:
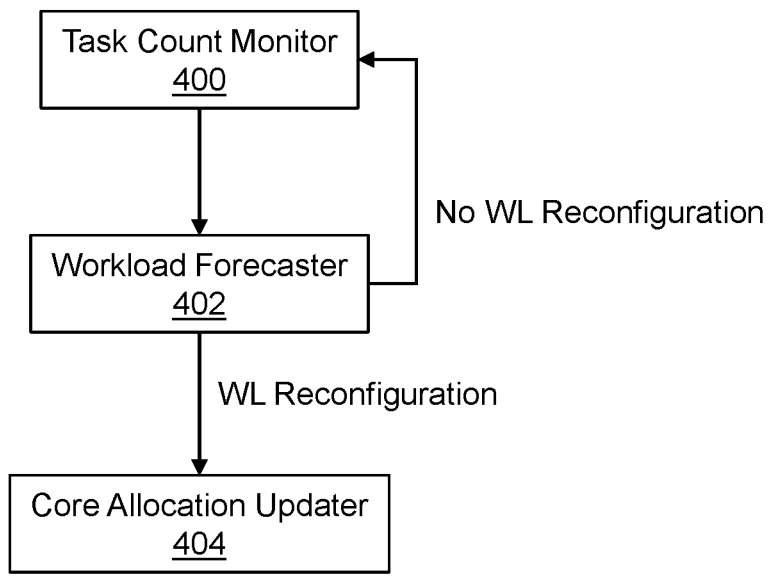
FIG. 4 illustrates workload reconfiguration.

FIG. 4 illustrates workload reconfiguration using the workload model. The features are implemented by the processors and memory of the compute nodes. A task count monitor 400 counts performances of the tasks that are used as the features of the workload model. Specifically, the task count monitor generates counts of the tasks performed to service the current actual workload. A workload forecaster 402 uses those task counts to forecast how the actual workload is likely to change within some timeframe. The workload forecaster may use autoregressive integrated moving average (ARIMA), exponential moving average, or other statistical analysis techniques. The predicted future task counts are compared with the task counts of the WL configurations of the model. If the task counts of the currently implemented WL configuration are the best match to the predicted future task counts, then no WL reconfiguration is indicated. If no WL reconfiguration is indicated, then task count monitoring continues in step 400. If the task counts of the currently implemented WL configuration are not the best match to the predicted future task counts, then WL reconfiguration is indicated, in which case the WL configuration in the model that is the best match to the predicted future task counts is selected by comparing the forecasted workload task counts with the task counts of the workload configurations of the workload model. Similarity is calculated using a statistical comparison. If WL reconfiguration is indicated, then a core allocation updater 404 reconfigures the allocation of cores to the WL configuration that best matches the forecasted actual workload. For example, if the implemented WL configuration has 16 cores allocated to each of the front-end emulations, back-end emulations, and data services emulations and the best match WL configuration has 32 cores allocated to the front-end emulations, 4 cores allocated to the data services emulations, and 12 cores allocated to the back-end emulations, then there are WL deltas of 16, −12, and −4 cores respectively for the front-end emulations, data services emulations, and back-end emulations. Emulations with negative deltas are used as sources of cores and emulations with positive deltas are targets of cores. Cores are reallocated from the source emulations to the target emulations in order to reconfigure the storage system to the best match WL configuration.

FIG. 5 illustrates a current (implemented) WL configuration 500 and a best match to forecasted workload configuration 502. The front-end emulations, data services emulations, and back-end emulations are each statically allocated 4 cores, regardless of the implemented WL configuration. The emulations are allocated additional cores in groups of 4 cores to match the core allocations of the WL configuration being implemented. All emulation processes are provisioned on the cores that are not statically allocated but only the processes to which the cores are allocated are active. The non-active processes are hibernating. For example, cores in which the front-end emulation is active are provisioned with the data services and back-end emulations, but those emulation processes are in a hibernation state. Matching of source and target emulations for reconfiguration is calculated to enhance computational efficiency by promoting locality. For example, each emulation may be allocated a set of sequential cores that are in closest physical proximity, e.g., in the same socket, and may share the same cache and L1/L2 memory resources where non-uniform memory access (NUMA) is implemented.

Figure 6:
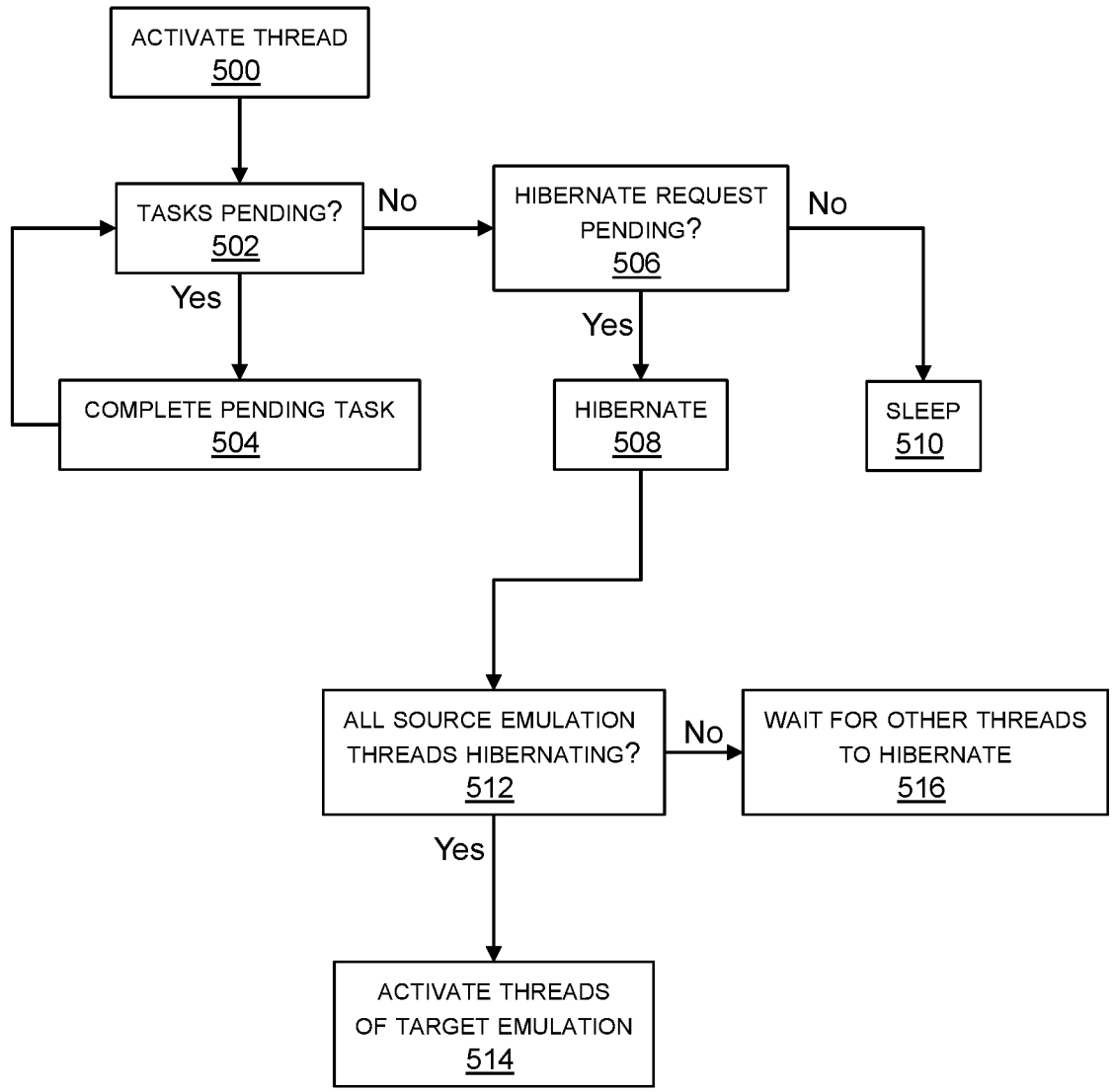
FIG. 6 illustrates hibernation of threads to prepare for workload reconfiguration.

FIG. 6 illustrates hibernation of threads to prepare for workload reconfiguration. Because a core can only actively run the process threads of one emulation at any given time, all process threads of a core-source emulation are placed in hibernation before the process threads of the core-target emulation are activated. A thread is activated as shown in step 500. If there are tasks pending as determined in step 502, then the task is scheduled and completed in step 504 and the flow returns to step 502. This loop is iterated for as long as tasks are pending. If no tasks are pending, then step 506 is determining whether a hibernate request is pending. A hibernate request is made by the core allocation updater when a WL reconfiguration is to be implemented. If a hibernate request is pending, then the thread is placed in hibernation as indicated in step 508. Otherwise, the thread is placed in sleep mode as indicated in step 510. Threads in sleep mode are still active and may be awakened when tasks are pending. Thus, threads continue to run on the core until a hibernate request is pending, and all pending tasks have been completed. If some of the source emulation threads are still running, then the process waits for the other threads to hibernate as indicated in block 516. When all the process threads of the core-source emulation are hibernating as determined in step 512, then the threads of the core-target emulation are activated as indicated in step 514.

Figure 7:
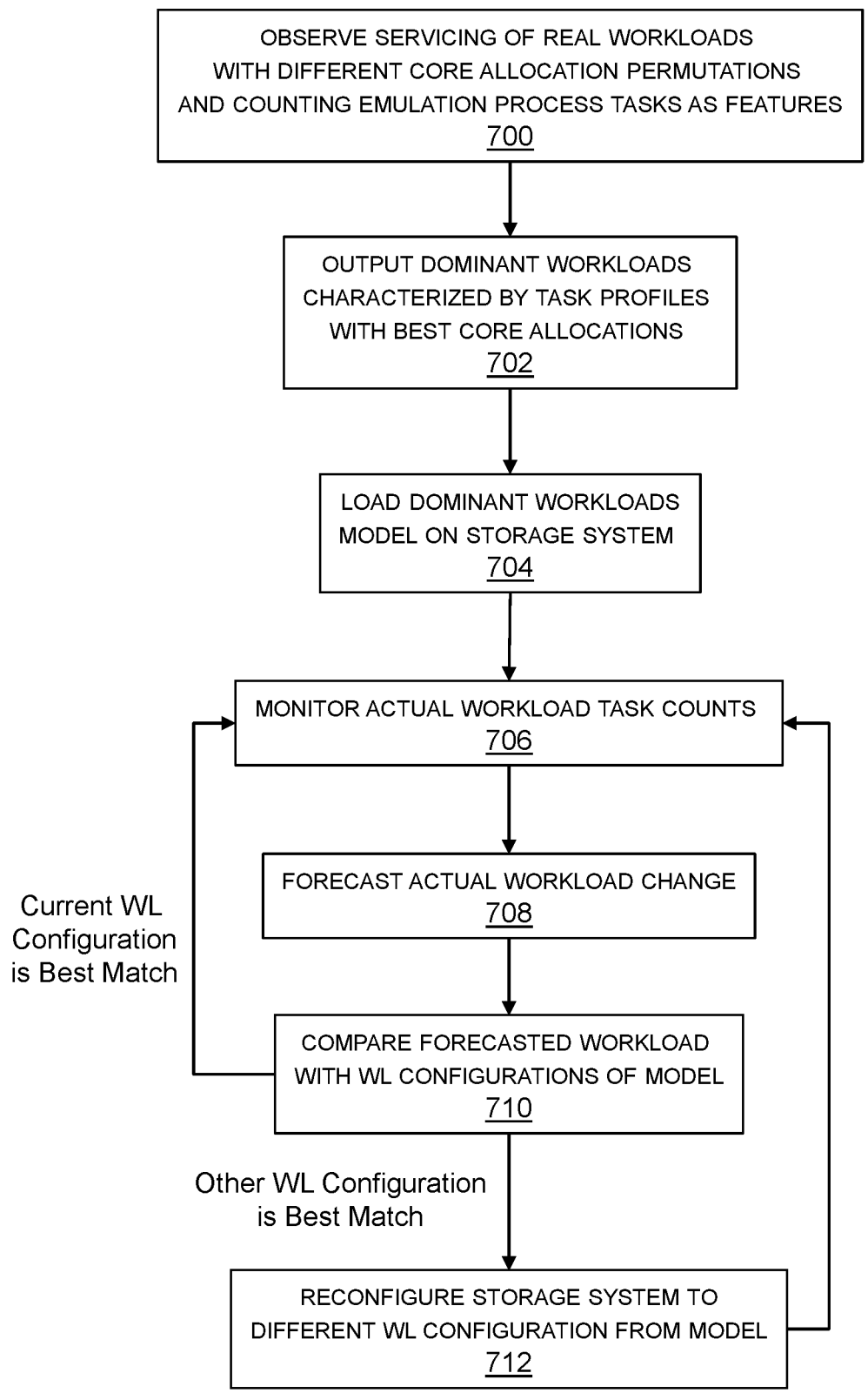
FIG. 7 illustrates a method for implementing autonomous core affinity.

FIG. 7 illustrates a method for autonomous core affinity. Step 700 is observing the storage system servicing real workloads with different core allocation permutations and creating counts of emulation process tasks performed. Each core allocation may be observed with each workload for the same duration of time and the IOPS recorded. Step 702 is outputting a model of the dominant workloads. The dominant workloads may be the most frequently observed ones of the real workloads as characterized by the feature counts or ranges of feature counts. For each dominant workload, the model includes the corresponding characteristic feature counts and the core allocation that yielded the greatest IOPS. The model is loaded onto a storage system for use in regular service as indicated in step 704. While in service, the storage system monitors task counts of the actual workload as indicated in step 706. Using those task counts, the storage system forecasts how the actual workload is likely to change within some timeframe as indicated in step 708. For example, statistical forecasting techniques can be used to predict future task counts. The predicted future task counts are compared with the task counts of the WL configurations of the model as indicated in step 710. If the task counts of the currently implemented WL configuration are the best match to the predicted future task counts, then monitoring in step 706 continues. If the task counts of the currently implemented WL configuration are not the best match to the predicted future task counts, then the WL configuration of the model that is the best match to the predicted future task counts is selected and implemented as indicated in step 712. Specifically, the compute nodes of the storage system are reconfigured to the core allocations of the WL configuration that is the best match to the predicted future task counts. Steps 706 through 712 are iterated automatically so the storage system self-reconfigures to the best fitting core allocation of the model as the actual workload changes.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   creating a model of storage system workload configurations, each workload configuration including counts of tasks that characterize a respective workload of a plurality of different workloads and exclusive allocations of processor cores to emulations for servicing the respective workload;
   counting tasks performed to service a current actual workload to generate a task count;
   forecasting a change in the current actual workload based on the task count; and
   selecting and implementing one of the workload configurations of the model based on comparison of the counts of tasks associated with the workload configurations and the forecasted change in the current actual workload based on the task count.

2. The method of claim 1 further comprising forecasting the change in the current actual workload based on the task count in terms of forecasted workload task counts.

3. The method of claim 2 further comprising creating the model by observing performance of the storage system serving multiple real-world workloads with different permutations of exclusive allocations of the processor cores to the emulations.

4. The method of claim 3 further comprising creating the model by selecting dominant ones of the real-world workloads and selecting the permutation of exclusive allocations of the processor cores to the emulations that yields best observed performance for each of the selected dominant workloads.

5. The method of claim 4 further comprising reconfiguring from a first workload configuration to a second workload configuration by identifying deltas of core counts allocated to emulations and reallocating cores from source emulations to target emulations based on the deltas.

6. The method of claim 5 further comprising hibernating all threads of ones of the source emulations on a core before activating ones of the target emulations on the core.

7. The method of claim 6 further comprising selecting the source and target emulations to promote locality.

8. A storage system comprising:
   a plurality of compute nodes that manage access to non-volatile drives;
   a model of storage system workload configurations, each workload configuration comprising counts of tasks that characterize a respective workload of a plurality of different workloads and exclusive allocations of processor cores to emulations for servicing the respective workload;
   a task count monitor configured to count the tasks performed to service a current actual workload to generate a task count;
   a workload forecaster configured to forecast a change in the current actual workload based on the task count; and
   a core allocation updater configured to select and implement one of the workload configurations of the model based on comparison of the counts of tasks associated with the workload configurations and the forecasted change in the current actual workload based on the task count.

9. The apparatus of claim 8 further comprising the workload forecaster configured to forecast the change in the current actual workload based on the task count in terms of forecasted workload task counts.

10. The apparatus of claim 9 further comprising the model being based on observed performance of the storage system serving multiple real-world workloads with different permutations of exclusive allocations of the processor cores to the emulations.

11. The apparatus of claim 10 further comprising the model being created by selection of dominant ones of the real-world workloads and selection of the permutation of exclusive allocations of the processor cores to the emulations that yields best observed performance for each of the selected dominant workloads.

12. The apparatus of claim 11 further comprising the core allocation updater reconfiguring from a first workload configuration to a second workload configuration by identifying deltas of core counts allocated to emulations and reallocating cores from source emulations to target emulations based on the deltas.

13. The apparatus of claim 12 further comprising the core allocation updater hibernating all threads of ones of the source emulations on a core before activating ones of the target emulations on the core.

14. The apparatus of claim 13 further comprising the core allocation updater selecting the source and target emulations to promote locality.

15. A non-transitory computer-readable storage medium storing instructions that when executed by a computer perform a method comprising:
   creating a model of storage system workload configurations, each workload configuration including counts of tasks that characterize a respective workload of a plurality of different workloads and exclusive allocations of processor cores to emulations for servicing the respective workload;
   counting tasks performed to service a current actual workload to generate a task count;
   forecasting a change in the current actual workload based on the task count; and
   selecting and implementing one of the workload configurations of the model based on comparison of the counts of tasks associated with the workload configurations and the forecasted change in the current actual workload based on the task count.

16. The non-transitory computer-readable storage medium of claim 15 wherein the method further comprises forecasting the change in the current actual workload based on the task count in terms of forecasted workload task counts.

17. The non-transitory computer-readable storage medium of claim 16 wherein the method further comprises creating the model by observing performance of the storage system serving multiple real-world workloads with different permutations of exclusive allocations of the processor cores to the emulations.

18. The non-transitory computer-readable storage medium of claim 17 wherein the method further comprises creating the model by selecting dominant ones of the real-world workloads and selecting the permutation of exclusive allocations of the processor cores to the emulations that yields best observed performance for each of the selected dominant workloads.

19. The non-transitory computer-readable storage medium of claim 18 wherein the method further comprises reconfiguring from a first workload configuration to a second workload configuration by identifying deltas of core counts allocated to emulations and reallocating cores from source emulations to target emulations based on the deltas.

20. The non-transitory computer-readable storage medium of claim 19 wherein the method further comprises hibernating all threads of ones of the source emulations on a core before activating ones of the target emulations on the core and selecting the source and target emulations to promote locality.

\* \* \* \* \*